2,759,207

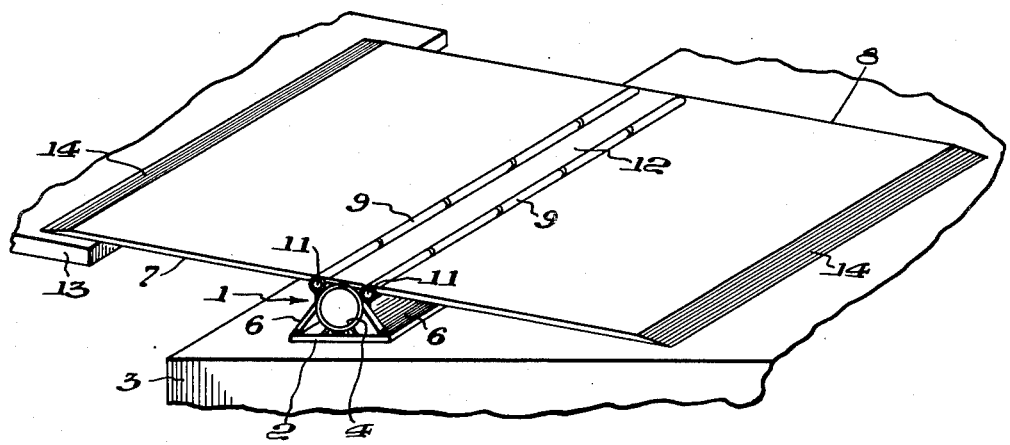
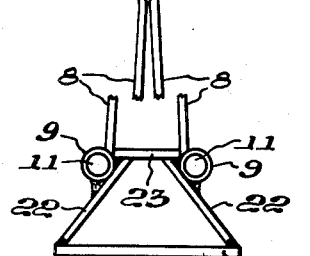
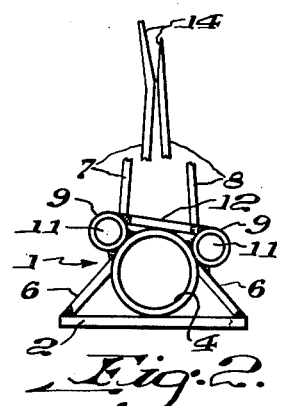
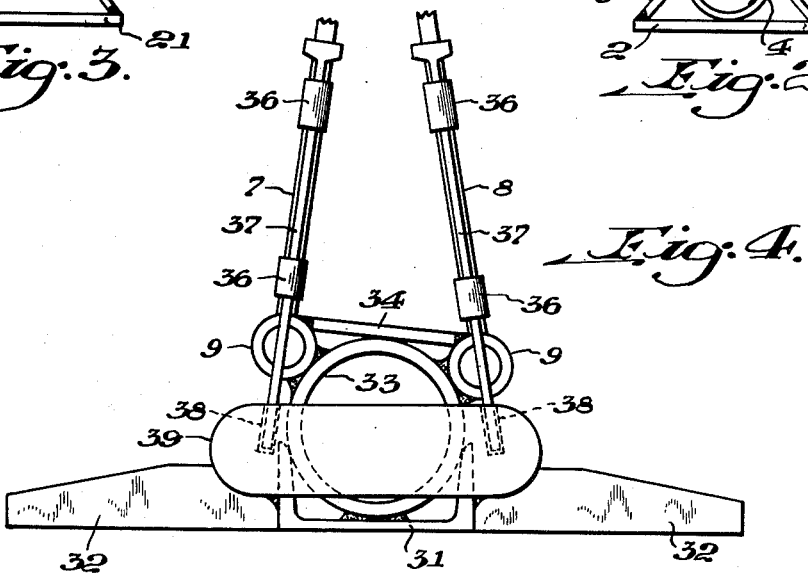

LOADING RAMP

William A. Pennington, Pittsburgh, Pa., assignor to Superior Railway Products Corporation, Pittsburgh, Pa., a corporation of Pennsylvania Application February 2, 1951, Serial No. 209,032

3 Claims. (Cl. 14—72)

This invention relates to loading ramps for facilitating the movement of material between two platforms, such as a loading platform and a vehicle platform.

It is among the objects of this invention to provide an improved loading ramp that may be easily positioned to bridge the gap between two platforms, especially when the platforms are at different levels, and yet will not be easily dislodged by inadvertence; that may be folded to occupy a minimum space when not in use and will be readily portable when folded, and that may be economically made and yet withstand rough usage.

In accordance with this invention, the loading ramp comprises an elongated rigid support member of desired height provided with a base portion and with a top portion that is narrower than the base portion, and two loading aprons hingedly mounted in spaced relation to each other on opposite sides of the support member adjacent to its top portion, so that the space between the opposed hinged edges of the aprons is less than the width of the base portion.

The invention is illustrated in the accompanying drawings, in which Fig. 1 is a perspective view of the ramp positioned for use between a loading platform and a vehicle platform; Fig. 2, an end elevation of the same ramp in its folded position; and Figs. 3 and 4 are similar elevations of modified forms of the ramp, of which Fig. 4 also shows locking means for the loading aprons.

Referring to Figs. 1 and 2, the ramp has a support member 1, which includes a long and rather narrow plate 2, forming a base portion that is adapted to rest on a loading platform or dock 3. Mounted centrally on the base portion and extending lengthwise of it is a cylindrical tube 4, having a diameter substantially less than the width of the base portion. On either side of the tube is a side plate 6, having its lower edge secured to the longitudinal edge of the base portion and its upper edge secured to the side of the tube. As a result, the side plates converge inwardly and upwardly to form a very rigid and stable support member.

Hingedly mounted on this support member are two loading aprons 7 and 8. Each apron is hingedly connected to opposite sides of the tube 4 adjacent to the side plates 6 by hinges 9 and hinge pins 11. The hinged edges of each apron are accordingly mounted in spaced relation to each other, being separated by the rounded top of the tube. The space between the hinges is preferably made flat by a top plate 12, which rests on the tube and is welded to the hinges, forming the top portion of the support member.

In its extended position, as shown in Fig. 1, the outer edge of apron 7 rests on a vehicle platform 13, and the outer edge of apron 8 rests on the loading dock 3, which is assumed to be at a lower level. To facilitate the movement of trucks on and off the ramp, the outer edges 14 of each apron are bevelled.

In Fig. 2, the ramp is shown in its folded position, in which both aprons are folded upward and inward on their hinges and then secured together by any convenient means, such as that described below in connection with Fig. 4. In this folded position, the ramp is perfectly stable and occupies a minimum space; and it may be readily moved from one loading station to another or to temporary storage. Its portability may be increased by the addition of retractable casters (not shown) on the support member, or by the use of pintles or holes (likewise not shown) in the support member or in the apron to engage corresponding holes or pintles in a moveable dolly.

For loading docks that are considerably lower than the conventional vehicle platforms, that is where the ramp will always incline downwards from the vehicle to the dock, it will be found desirable to have the outer apron 7 hinged at a somewhat higher point on the support member than the inner apron 8. Such construction makes the surfaces of both aprons and the top portion 12 of the support member more nearly in the same plane when the ramp is in use, thereby facilitating the movement of material from one platform to the other. This construction is shown in Fig. 1, but more clearly illustrated in Fig. 2, in which the side plate 6 below apron 8 does not extend as high as the other side plate 6 on the opposite side of the tube 4, thereby permitting the hinges 9 for apron 8 to be set at a lower level than the corresponding hinges for the other apron.

In Fig. 3 is shown a modified form of support member, made of four rectangular plates, a base plate 21 (forming the base portion), two converging side plates 22 and a top plate 23 (forming the top portion), which are welded together at, or adjacent to, their longitudinal edges to form a support member that has a vertical cross-section substantially in the shape of a trapezoid. The sides of this trapezoid may be of equal length as shown in Fig. 3, or of unequal length to permit the hinged edges of the aprons to be at different heights for the purposes previously described.

Fig. 4 shows a further modified form of support member, in which the base portion consists of an inverted channel member 31 and sideward extending leg portions 32. Supported within the channel and rigidly secured to it is a cylindrical tube 33. Welded, or otherwise secured, to opposite sides of the tube near the top thereof are hinges 9 on which are mounted the loading aprons 7 and 8. A top plate 34, forming the top portion of the support member, is secured between the hinges above the tube 33. In order to lock the loading aprons in their substantially vertical folded position, a locking means of the type shown may be used. It comprises aligned sleeves 36 mounted on the side edge of each apron for slidably receiving a bolt 37, which is adapted to slip into hole 38 in a locking block 39 fastened to one end of the support member. With the bolts in place in the block, the aprons are securely locked in an upright position.

It is an advantage of the ramp herein described that it may be easily and economically manufactured of readily available materials and that it is of light but durable construction. The construction of the support member, in which the top portion is narrower than the base portion, gives the ramp stability both in its operative and folded positions. In addition, the extensive area of contact between the base portion of the support member and the loading dock makes the ramp much less subject to accidental dislodgement than would otherwise be the case if the ramp were a single flat steel plate. Another advantage in this improved type of ramp is that it may be easily folded into the position shown in Figs. 2, 3, and 4 locked in that position, and then moved to another loading station or to storage.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A loading ramp for bridging the gap between two platforms, which are at different levels, comprising a support member adapted to rest on one of the platforms, the support member including an elongated base portion and a substantially flat top portion that is narrower than the base portion, and means for rigidly supporting the top portion centrally above the base portion; two loading aprons hingedly mounted in spaced relation to each other on opposite sides of the top portion of the support member, each apron in its extended position being adapted to have the edge that is opposite its hinged edge rest on one of the platforms; and locking means for holding the two aprons in a substantially vertical closed position when the ramp is not in use, said locking means including a sleeve mounted on a side edge of each apron and a locking bolt slidably received in each sleeve and a locking block mounted on an end of the support member with holes therein for receiving the locking bolts when the aprons are in a substantially vertical closed position.

2. A portable loading ramp for bridging the gap between two platforms, comprising a support member adapted to rest on one of the platforms, the support member having an elongated base portion including an inverted channel member with sidewardly extending legs secured thereto and also having a top portion including a cylindrical tube that has a diameter less than the width of the base portion and that is rigidly mounted on and partially contained within the channel member, two loading aprons with their inner edges hingedly mounted in spaced relation to each other on opposite sides of said tube, each apron being adapted to occupy an extended position in which its outer edge rests on one of the platforms and each apron also being adapted to occupy an upright closed position in which its outer edge is directly above the support member, and locking means for each apron that includes a releasable locking member rigidly connecting the support member and the apron in locking relationship when the apron is in its upright closed position.

3. A portable ramp for bridging the gap between two platforms, comprising a hollow support member adapted to rest on one of the platforms, the support member including an elongated base portion in the form of a rectangular plate and a top portion also in the form of an elongated rectangular plate that is narrower than the base portion and an elongated tubular member secured to the base portion and supporting the top portion centrally above the base portion at a height less than the width of the base portion, two loading aprons having their inner edges hingedly mounted in spaced relation to each other on opposite sides of said top portion, each apron in its extended open position being adapted to have its outer edge rest on one of the platforms and each apron also being adapted to occupy an upright closed position in which its outer edge is directly above the support member, and locking means for each apron that includes a releasable locking member rigidly connecting the support member and the apron in locked relationship when the apron is in its upright closed position.

References Cited in the file of this patent

UNITED STATES PATENTS

| | | |
|---|---|---|
| 479,533 | Schultz | July 26, 1892 |
| 770,652 | Posey | Sept. 20, 1904 |
| 1,174,864 | Hillier | Mar. 7, 1916 |
| 2,188,123 | Swensen et al. | Jan. 23, 1940 |
| 2,449,829 | Agren | Sept. 21, 1948 |
| 2,644,180 | Eycleshimer | July 7, 1953 |